Figure 1:
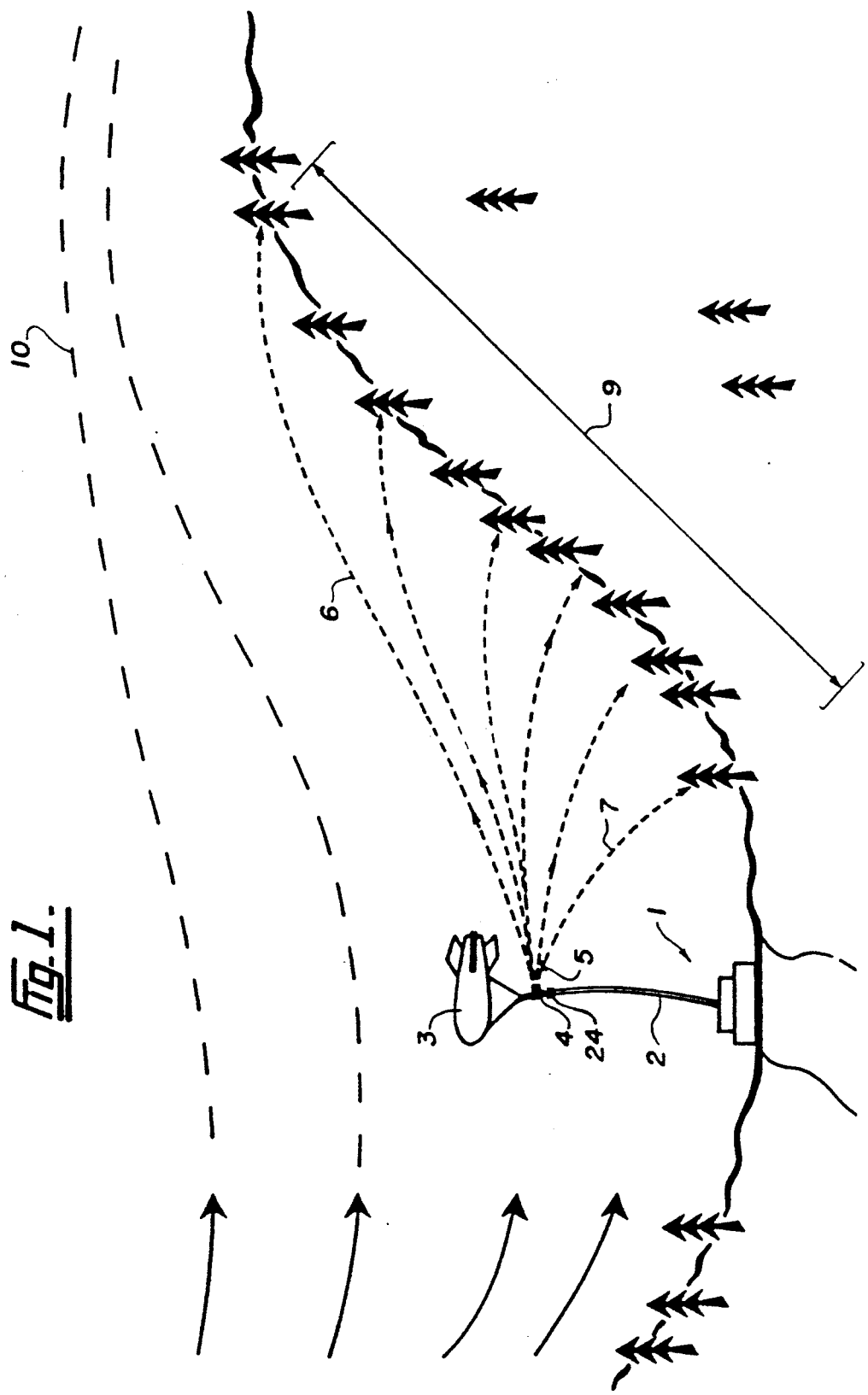

United States Patent [19]

Esplin

[11] Patent Number: 5,322,219
[45] Date of Patent: Jun. 21, 1994

[54] BALLOON FOREST FERTILIZATION

[75] Inventor: Gordon J. Esplin, North Vancouver, Canada

[73] Assignee: Genesis Engineering Inc., North Vancouver, Canada

[21] Appl. No.: 713,896

[22] Filed: Jun. 12, 1991

[51] Int. Cl.$^5$ .............................................. B64D 1/18
[52] U.S. Cl. .................................... 239/171; 239/251; 244/33; 244/136
[58] Field of Search .................... 239/171, 251, 265.11; 244/33, 136; 169/53

[56] References Cited

U.S. PATENT DOCUMENTS

| | | | |
|---|---|---|---|
| 2,954,932 | 10/1960 | Albano | 239/251 |
| 3,369,673 | 2/1968 | Mosher | 244/33 |
| 3,381,922 | 5/1968 | Laing | 239/171 |
| 4,848,656 | 7/1989 | Magill | 239/171 |

FOREIGN PATENT DOCUMENTS

| | | | |
|---|---|---|---|
| 0031997 | 2/1990 | Japan | 244/33 |
| 0031998 | 2/1990 | Japan | 244/33 |

OTHER PUBLICATIONS

Journal of the Air Pollution Control Association vol. 38 #(9) pp. 1,158–1,161, Sep. 1988.

Primary Examiner—Andres Kashnikow
Assistant Examiner—Karen B. Merritt

[57] ABSTRACT

A process for applying particles to a geographic region. The process involves flying a balloon over the region. The balloon carries a nozzle with a pipe communicating the nozzle with a ground supply of air and a source of particles. A mixture of air and particles can be forced up the pipe to the nozzle. The particles are then discharged over the region according to a pre-determined pattern. The process permits the accurate measured application of fertilizers and the like to a forest region.

11 Claims, 3 Drawing Sheets

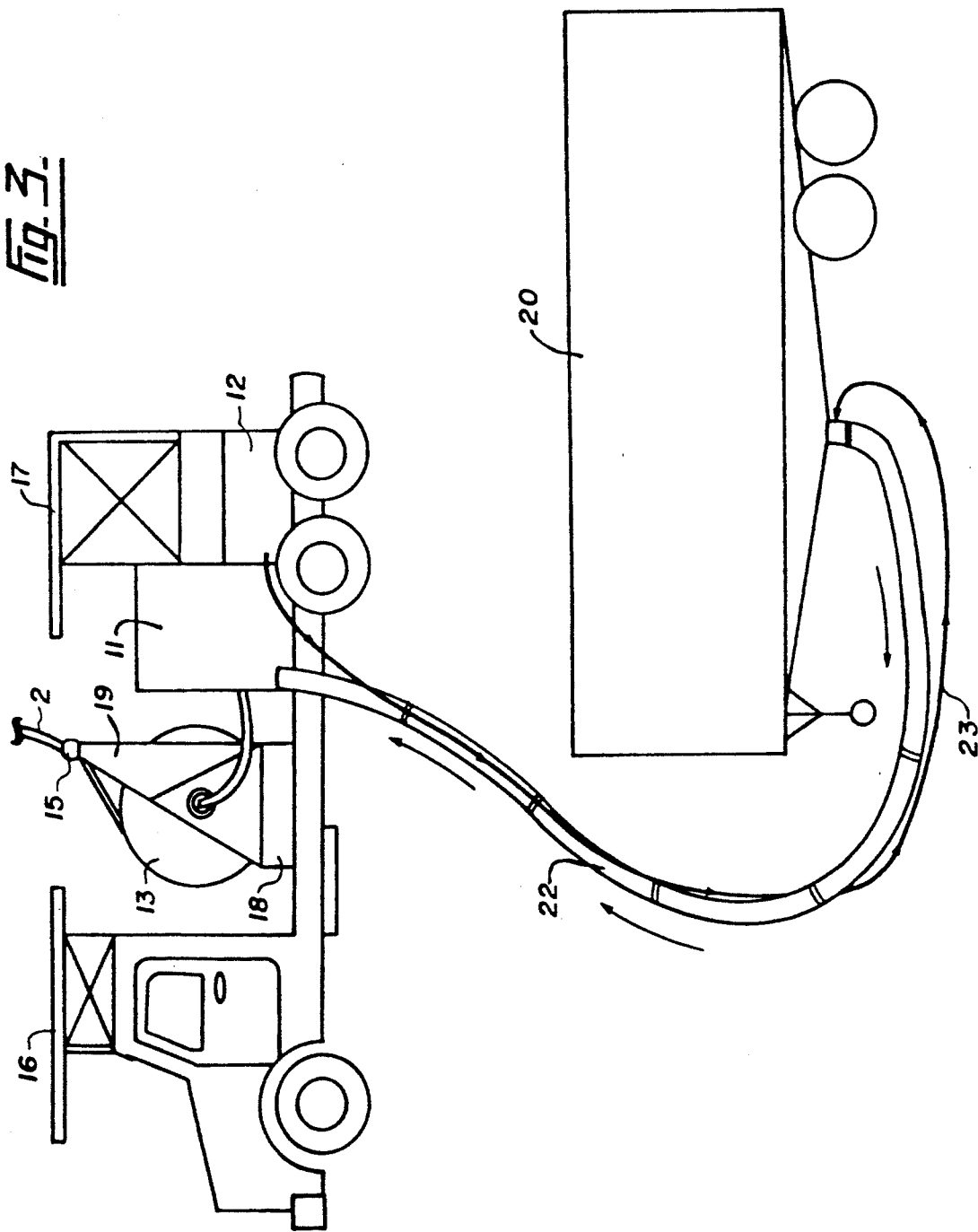

BALLOON FOREST FERTILIZATION

FIELD OF THE INVENTION

This invention relates to a process for applying particles to a geographic region. It finds particular application in forestry but is also applicable to agricultural lands, grazing lands and deserts.

Although the forest industry is a major source of jobs and of export revenue to many nations of the world, its future is being threatened because of reduced harvestable inventories. Old growth timber is rapidly disappearing or being taken up by parks and by forest preserves. New growth is not keeping up with present market demand.

Forest health and productivity can be improved through the application of fertilizers and other additives (e.g., soil amendments, fire retardants, liming agent, etc., hereafter generically referred to as "fertilizers").

DESCRIPTION OF THE PRIOR ART

Existing technology uses helicopters or airplanes to spread the fertilizer over "swaths" of the forest. In the forests of the west coast of Canada a typical application for the fertilizer urea is 200 kg/ha of available nitrogen (435 kg/ha urea). Helicopter costs are about $0.25/kg ($100/ha) and the fertilizer costs (at $250/ton available nitrogen) are about $50/ha. Total direct costs are therefore about $150/ha, to which administrative costs must be added.

These existing costs are too high for fertilization to be extensively practiced. Therefore, at present fertilization is used on only a relatively small portion of the forests and generally on a heavy dose one application basis. Professional foresters would prefer the fertilizer to be applied to larger areas at a lower dosage higher frequency basis since too high a dosage will result in inefficient fertilizer utilization and may also stress sensitive species.

Alternatives to the manned aircraft system of forest fertilization have been proposed. For example U.S. Pat. No. 3,381,922 issued May 7, 1968 teaches an unmanned, captive helicopter for distributing fertilizer over large areas of ground. A pipe between a ground station and the helicopter is used to convey the material plus compressed air to the helicopter. The energy of the compressed air is used to power the helicopter rotors and therefore to keep the machine aloft.

These alternatives have not replaced the existing manned aircraft technologies because they have not proven to be reliable or of a lower cost.

Applicant has described the use of tethered, helium-filled balloons for sampling the lower atmosphere (JAPCA 38(9), p 1158) and computer modelling the trajectories of aerosols released aloft.

There is, therefore, a need for a process for applying particles to geographic regions that is relatively inexpensive to operate and effective in operation.

SUMMARY OF THE INVENTION

Figure 2:
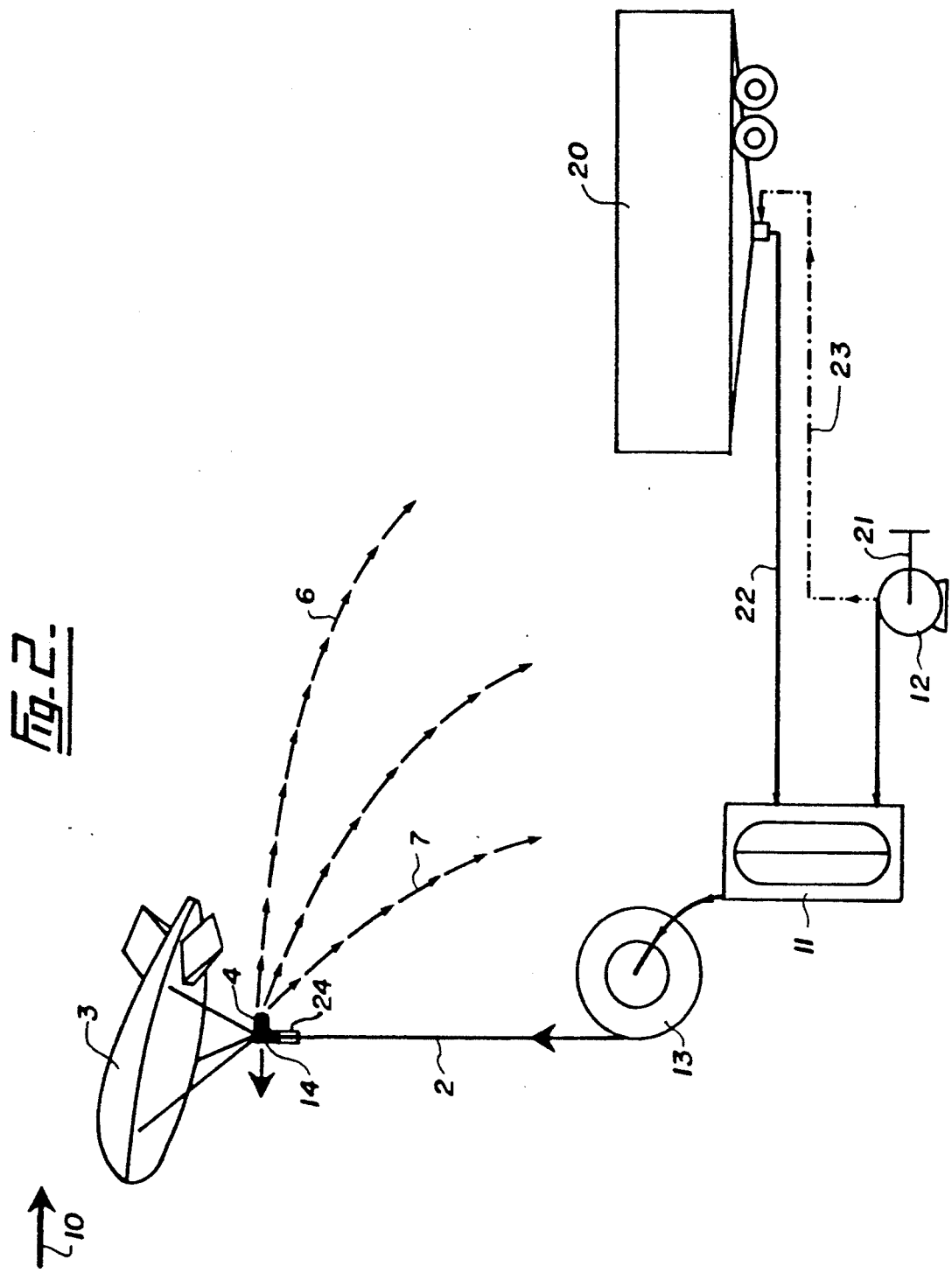

To this end, the present invention provides a process for applying particles to a geographic region comprising flying a balloon over the region, the balloon carrying a nozzle with a pipe communicating the nozzle with a ground supply of air and a source of particles; forcing a mixture of air and particles up the pipe to the nozzle; and discharging the particles over the region according to a pre-determined pattern.

The balloon is preferably helium filled.

The present invention thus provides a system of forest fertilization which uses a helium-filled balloon as an aerial platform for dispersing fertilizer over forests and water-sheds. The balloon is used to lift a hose 500–1500 ft. above ground. The hose is light-weight and of small diameter and conveys the fertilizer (ground to a specific particles size) high above the forest where the wind, which constantly changes in both direction and velocity, disperses the particles over a large, but controllable, area. Existing logging and fire-access roads are used to move the ground-based equipment and trailer loads of fertilizer. Waterways may be used in which case the equipment is carried on a boat or barge.

In a preferred embodiment the pre-determined pattern is determined by a computer programm used to predict where the particles will land, given their height of release and the measured wind conditions. By controlling the height and the rate of fertilizer emissions, as well as the size distribution of the fertilizer particles, they can be transported by the wind to the desired receiving area.

BRIEF DESCRIPTION OF THE DRAWINGS

The invention is illustrated, by way of example, in the drawings in which:

FIG. 1 is a pictorial representation of the process;

FIG. 2 shows schematically the hardware used in the process according to the present invention; and FIG. 3 illustrates a further aspect of the hardware used in the process of the present invention.

DESCRIPTION OF THE PREFERRED EMBODIMENTS

FIG. 1 shows a mobile, ground-based system 1 that blows a mixture of fertilizer particles and air up a hose 2. The hose 2 is hoisted aloft (500 to 1500 feet) by a helium-filled balloon 3. The air an particle mixture exits from the upper end of the hose via a nozzle 4, which ejects the mixture in the form of a horizontal plume 5. The particles in the plume will immediately be acted upon by aerodynamic and gravitational forces. The smallest particles will tend to follow the wind streamlines 6 while the larger particles will tend to cross the streamlines as at 7 and to precipitate out because of their much greater ratio of gravitational to aerodynamic forces. By controlling the size distribution of the particles and the height of the balloon 3 the application swath 9 of the deposited particles can be, to a large extent, controlled.

The wind streamlines 10 tend to follow the ground contours, thus allowing the process to be used in hilly terrain. The direction of the wind will determine where the application swath can be applied. However, it is known that the wind direction is subject to frequent change due to weather fronts passing through, or due to the mesoscale, diurnal mountain-valley breezes and/or land-sea breezes. Thus, the process can be used to apply fertilizer to all forested geographic regions that are within approximately 10 km of an access road or navigable body of water.

Usually the fertilizer particles will be applied in the form of dry particulate. However, the process can also be utilized to apply liquid particles to, for example, forests since the principle of the operation will be identical.

FIG. 2 shows the hardware used in the process of the invention. Granular fertilizer is conveyed from its source (a trailer 20 is shown) to a grinder/classifier 11 along hose 22. Conveyance can be via conventional dense-phase pneumatic conveying using line 23, or via an auger or other standard means. The grinder/classifier 11, commercially available from various vendors, reduces the granular fertilizer material to a fine powder, typically with a particle-size distribution falling with 15–150 microns. Large particles are retained within the system until they are reduced down to a size which can be passed by the classifier section of the system. A blower 12 with an air intake 21 is used to convey the air-particles mixture pneumatically up the hose 2. The energy contained in the air from the blower may also be used to power the grinder. The blower would typically have a capacity of 100–1000 cfm, with 500 cfm being correct for most applications.

The hose 2 is stored upon a drum 13 which also is used as a winch to alter the elevation of the balloon 3. The hose enters the drum 13 via its hub so that the winch may be rotated without having to uncouple the hose. The hose is fabric-reinforced, thin-wall hose typically of a diameter within the range 2 to 6 inches, preferably about 4 inches. The drum is typically of a diameter of seven feet with a three feet hub and a width of eight feet. This size will store 1100 feet of 4 inch diameter hose, which will be adequate for most applications.

The hose is attached to the balloon 3 via the discharge-nozzle 4 to provide some control over the movement of the balloon. Experimentation with similar helium-filled balloons has shown that they can be rigged to provide significant lift during conditions of medium to strong winds and hence will hover in a relatively stationary position above the ground-station. However, during periods of light winds (<5 mph) there is little aerodynamic lift and the balloon will wander and hence may snag the hose upon a tree or other high object. The discharge nozzle 4 can therefore be rotated in order to control the balloon using the thrust vector 14, which results from the horizontal, high-velocity discharge of the air-particle mixture out of the nozzle 4. The thrust would typically be 20 pounds of horizontal thrust from a 2 inch nozzle. The discharge nozzle 4 can be rotated by rotating the hose 2 by rotation of the drum 13, or by a servomotor 20 in response to signals sent up via wires attached to the hose or via conventional radio-control. The technology for automatic position control is well established and can be used in this process in order to maintain the balloon above the ground station. Or, the desired effect can be achieved by manually rotating the drum 13.

The trajectories of the various particles that are ejected from the nozzle 4 can be predicted using a computer program that is presently in public domain. This program requires the particles size distribution, density and the wind velocity profile. The wind velocity profile can be measured using commercial anemometers attached to the balloon harness (not shown).

Therefore, overall control of the fertilization process may be automated using computer technology, or may be manual via tables and charts derived for typical field usage. In either case known technology is used for process control.

For the application of liquid particles to forests the grinder/classifier 11 will not be required. The liquid from a tanker-trailer can be metered via a conventional eductor directly into the hose 2. The compressed-air from the blower 12 is then used to transport the resulting air-liquid mixture pneumatically up the hose 2. The discharge-nozzle 4 then sprays the liquid particles out as a mist and in the form of a plume 5. A standard nozzle can be used in order to achieve the desired size range of the liquid particles.

FIG. 3 shows a typical ground station for balloon based dry fertilization. A conventional truck carries the grinder/classifier 11, the blower 12, and the winch 13. The winch 13 is attached to a table 18 so that it can be rotated about a vertical axis. A clamp 15 attached to a winch arch 19 controls the position of the hose on the drum as well as fixing the balloon at the desired elevation. The truck contains a fore cradle 16 and an aft cradle 17 which are used to hold the balloon during storms or during longer relocations. This system would typically be capable of continuously applying 6 metric tons/hours at a silviculturally desirable dose of 20 to 100 kilograms per hectare.

Since the balloon is only used to lift a hose (plus optional control wires) 500–1500 ft up into the sky, it can be small enough to be deployed in rugged, wooded terrain. The heavy equipment, that is the truck with blower, grinder and classifier, and the trailers that are filled with fertilizer, is all ground-based and uses available technology. In principle this system can operate continuously 24 hours a day using the available winds in a scientific manner to disperse the fertilizer over a large area of the forest. Helicopters, on the other hand, can only be airborne for a few hours each day.

When the wind velocity is too low for effective dispersion (less than 0.5 m/s), or so high that aerodynamic forces are excessive (greater than about 10 m/s), then the balloon system cannot be used (about 15–25% of the total time depending upon location). The balloon can then be winched down to the ground by winding the pneumatic-transport hose 2 onto the ground-based storage drum 13.

For the case of urea fertilization the illustrated system can deliver six (6) metric tons/hour of L fertilizer at an average dose of about 96 kg/ha (44 kg/ha available nitrogen). This dosage is close to the optimum for forest fertilization. The balloon system can spread fertilizer for about 20% of the cost of helicopter systems, or for about $0.05/kg.

I claim:

1. A process for applying particles to a geographic region comprising:
    flying a balloon over the region, the balloon carrying a discharge nozzle with a pipe communicating the nozzle with a ground supply of air and a source of particles having a diameter in the range of 15 to 150 microns;
    forcing a mixture of air and particles up the pipe to the nozzle; and
    discharging the air and particles over the region in a horizontal plume according to a pre-determined pattern, the correct particle size, balloon elevation and discharge nozzle being controlled to achieve optimum distribution of the particles using the existing wind conditions.

2. A process as claimed in claim 1 in which the balloon is filled with helium.

3. A process as claimed in claim 1 in which the particles are solid particles selected from the group consisting essentially of fertilizers, liming agents and fire retardants.

4. A process as claimed in claim 1 in which the particles are liquid particles selected from the group consisting essentially of fertilizers, liming agents and fire retardants.

5. A process as claimed in claim 1 in which the geographic region is selected from the group consisting essentially of forest, agricultural lands, grazing lands and deserts.

6. A process as claimed in claim 1 in which the discharge nozzle is about 500-1500 feet above the ground.

7. A process as claimed in claim 1 in which a reaction force created at the nozzle is used to control the balloon under low wind conditions by rotating the direction of the nozzle.

8. A process as claimed in claim 7 in which the balloon is attached to the storage drum of a ground based winch and in which the nozzle is rotated by rotating the storage drum.

9. A process as claimed in claim 7 in which the discharge nozzle is rotated by a servomotor carried by the balloon.

10. A process as claimed in claim 7 in which the creation of correct particle size, balloon elevation and discharge nozzle orientation are controlled manually.

11. A process as claimed in claim 1 in which an apparatus for providing the mixture of particles and air is located on a truck.

* * * * *